(12) United States Patent
Chapman

(10) Patent No.: US 9,887,639 B2
(45) Date of Patent: Feb. 6, 2018

(54) COMMUNICATION WITHIN A POWER INVERTER USING TRANSFORMER VOLTAGE FREQUENCY

(71) Applicant: SunPower Corporation, San Jose, CA (US)

(72) Inventor: Patrick L. Chapman, Austin, TX (US)

(73) Assignee: SunPower Corporation, San Jose, CA (US)

( * ) Notice: Subject to any disclaimer, the term of this patent is extended or adjusted under 35 U.S.C. 154(b) by 0 days.

(21) Appl. No.: 15/355,843

(22) Filed: Nov. 18, 2016

(65) Prior Publication Data

US 2017/0070156 A1  Mar. 9, 2017

Related U.S. Application Data

(63) Continuation of application No. 14/159,084, filed on Jan. 20, 2014, now Pat. No. 9,509,232, which is a continuation of application No. 12/832,199, filed on Jul. 8, 2010, now Pat. No. 8,634,216.

(51) Int. Cl.
| | |
|---|---|
| *H02M 3/335* | (2006.01) |
| *H02J 1/10* | (2006.01) |
| *H02M 7/48* | (2007.01) |
| *H02M 1/00* | (2006.01) |
| *H02M 5/458* | (2006.01) |
| *H02M 7/5387* | (2007.01) |
| *H02M 1/08* | (2006.01) |
| *H02M 1/14* | (2006.01) |

(52) U.S. Cl.
CPC ............. *H02M 5/458* (2013.01); *H02M 1/08* (2013.01); *H02M 1/14* (2013.01); *H02M 3/33523* (2013.01); *H02M 7/53871* (2013.01); *H02M 2001/0009* (2013.01)

(58) Field of Classification Search
CPC ......... H02M 3/33507; H02M 3/33523; H02M 3/33553
USPC .............. 363/8, 17, 21.04, 21.05, 65, 71, 78
See application file for complete search history.

(56) References Cited

U.S. PATENT DOCUMENTS

| | | |
|---|---|---|
| 5,436,820 A | 7/1995 | Furmanczyk |
| 5,625,539 A | 4/1997 | Nakata et al. |
| 5,719,758 A | 2/1998 | Nakata et al. |
| 6,339,538 B1 * | 1/2002 | Handleman ............... G05F 1/67 136/293 |
| 6,563,718 B1 | 5/2003 | Li et al. |
| 6,602,627 B2 | 8/2003 | Liu et al. |
| 6,704,213 B2 | 3/2004 | Steimer |
| 6,909,620 B2 | 6/2005 | Park et al. |

(Continued)

OTHER PUBLICATIONS

Lai, R-S., et al, A PWM Method for Reduction of Switching Loss in a Full-Bridge Inverter, IEEE Transactions on Power Electronics, vol. 10, No. 3, May 1995, pp. 326-332.

(Continued)

*Primary Examiner* — Gary Nash
(74) *Attorney, Agent, or Firm* — Grasso PLLC

(57) ABSTRACT

Communicating across a power transformer is provided. Processes can include outputting a cyclical voltage at an alternating frequency across a multiple winding transformer and modulating the frequency of the alternating voltage to provide communication across the transformer. Devices and systems can also be employed with applicable features and designs.

20 Claims, 7 Drawing Sheets

(56) References Cited

U.S. PATENT DOCUMENTS

| | | | |
|---|---|---|---|
| 6,934,167 B2* | 8/2005 | Jang | H02J 5/005 363/21.02 |
| 2002/0154526 A1 | 10/2002 | Sakai et al. | |
| 2006/0221653 A1 | 10/2006 | Lai et al. | |
| 2006/0256598 A1 | 11/2006 | Ho et al. | |
| 2007/0042729 A1 | 2/2007 | Baaman et al. | |
| 2008/0096068 A1 | 4/2008 | Yamashita | |
| 2008/0247194 A1* | 10/2008 | Ying | H02M 3/3376 363/17 |
| 2009/0010028 A1* | 1/2009 | Baarman | H02J 5/005 363/25 |
| 2009/0251933 A1 | 10/2009 | Angerer et al. | |

OTHER PUBLICATIONS

Chen, R.Y. et al, Current-fed Full-bridge Boost Converter with Zero Current Switching for High Voltage Applications, IAS 2005, 0-7803-9208-6/05/$20.00 c 2005 IEEE, pp. 2000-2006, Power Electronics Laboratory, Department of Electrical Engineering, National Cheng-Kung University, Tainan City, Taiwan, R.O.C.

Liu, J., et al, A Novel Three Level Dual Buck Half Bridge Inverter, 978-1-4244-1874-9/08/$25.00 c2008 IEEE, pp. 483-487.

Zhu, C., et al, A Novel Split Phase Dual Buck Half Bridge Inverter, 0-7803-8975-1/05/$20.00 c2005 IEEE, pp. 845-849, Aero-Power Sci-Tech Center, Nanjing University of Aeronautics & Astronautics, Nanjing, P.R. China.

Wang, Z., et al, Simulation Study of Charge Controlled Half-cycle Modulated Dual Buck Half Bridge Inverter, Nanjing University of Aero.& Astro., College of Automation, Nanjing, China.

Yao, Z., et al, A Novel Control Strategy for Grid-Interactive Inverter in Grid-Connected and Stand-Alone Modes* (*This work was supported by the National Natural Science Foundation of China (50337030) and delta foundation.), 0-7803-9547-6/06/$20.00 c2006 IEEE, pp. 779-783, Aero-Power Sci-tech Center, College of Automation Engineering, Nanjing University of Aeronautics and Astronautics, Nanjing, P.R. China.

Yao, Z., Two-Switch Dual-Buck Grid-Connected Inverter, 978-1-4244-3557-9/09/$25.00 c2009 IEEE, pp. 2182-2187, College of Electrical Engineering, Yancheng Institute of Technology, Yancheng, China.

Yu, H., et al, A Novel Load Adaptive Zero Voltage Switching Utilizing Diode Reverse Recovery current for Soft-Switching Choppers and Inverters, 0-7803-7067-8/01/$10.00 c2001 IEEE, pp. 146-151, Center for Power Electronics Systems, The Bradley Department of Electrical and Computer Engineering, Virginia Polytechnic Institute and State University, Blacksburg, VA, USA.

International Search Report and Written Opinion, PCT/US2011/042190, dated Feb. 9, 2012.

* cited by examiner

COMMUNICATION WITHIN A POWER INVERTER USING TRANSFORMER VOLTAGE FREQUENCY

This application is a continuation of U.S. application Ser. No. 14/159,084, which is entitled Communication Within a Power Inverter Using Transformer Voltage Frequency, names Patrick L. Chapman as the inventor, and is U.S. Pat. No. 9,509,232. The '084 application is a continuation of U.S. application Ser. No. 12/832,199, which is also entitled Communication Within a Power Inverter Using Transformer Voltage Frequency, names Patrick L. Chapman as the inventor, and is now U.S. Pat. No. 8,634,216.

BACKGROUND

1. Technical Field

The present embodiments relate to communicating by a power inverter.

2. Related Art

Power inverters may be used in various applications to provide alternating current (AC) power to a load using a direct current (DC) power source. In some applications, knowledge of the operating conditions of the DC power source may be desired to control the output. When electrical coupling is permitted, these operating conditions may be communicated to any point in the power inverter through standard wired communication manners. However, in particular applications, due to regulatory and/or safety requirements, a physical isolation barrier may be required. Existence of the isolation barrier may prevent communication of the operating conditions by electrical coupling.

SUMMARY

According to one aspect of the disclosure, a power inverter having a transformer may communicate information regarding operating conditions of a DC power source through a voltage frequency of the transformer. The power inverter may include an input bridge to receive direct current (DC) power from the DC power source. The input bridge may convert a DC voltage from the DC power source to an AC voltage. The AC voltage may be applied to a first winding in the transformer. The frequency of the AC voltage may be selected by a first controller based on the operating conditions of the DC power source. A second AC voltage may be generated across a second winding in the transformer due to application of the AC voltage applied to the first winding. A second controller may determine the frequency of the second AC voltage. The second controller may determine the operating conditions of the DC power source based on the frequency of the second AC voltage.

BRIEF DESCRIPTION OF THE DRAWINGS

The disclosure may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
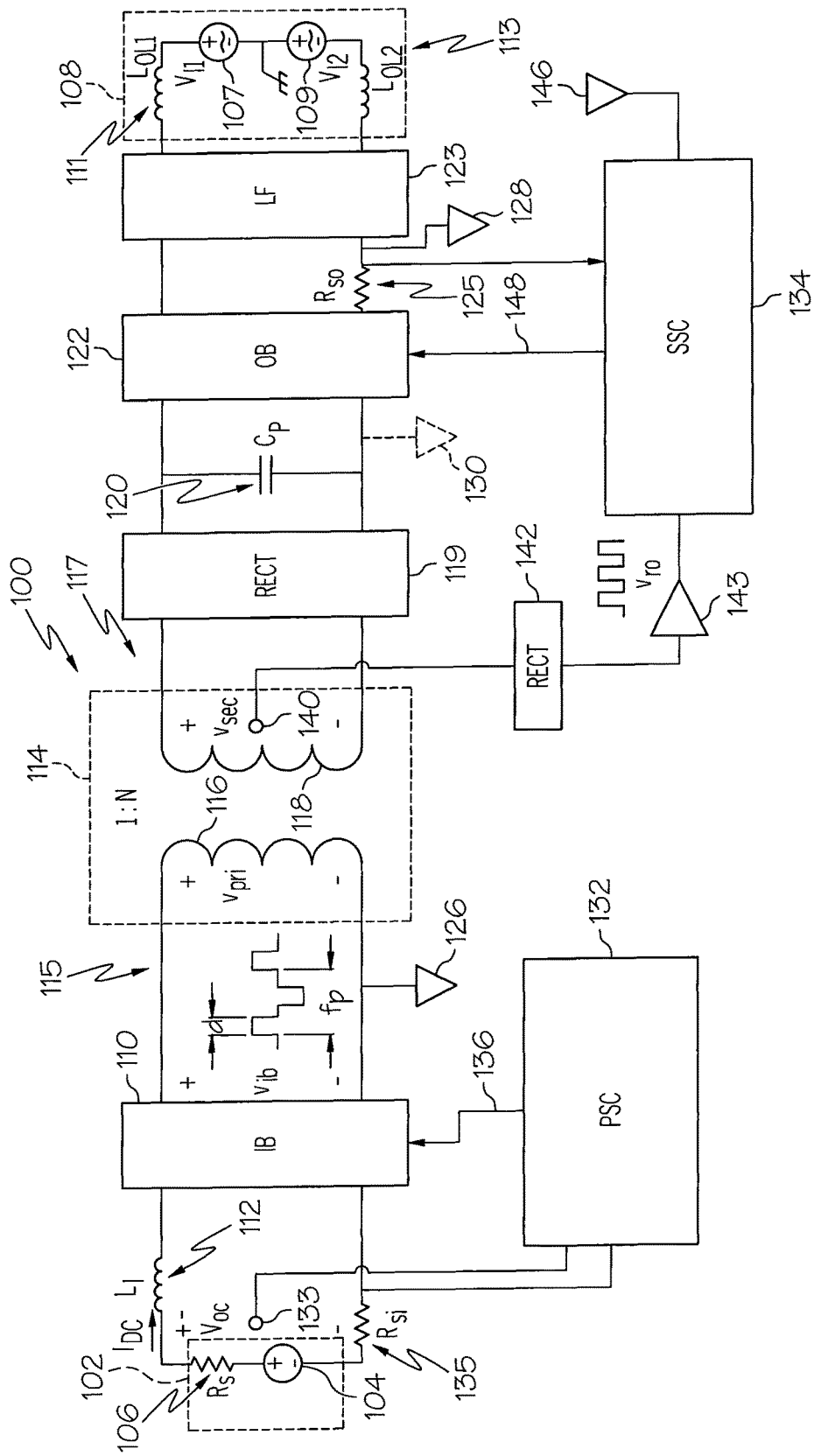
FIG. 1 is a circuit diagram of an example power inverter having an isolation barrier.

FIG. 1 is a circuit diagram of a power inverter 100. In one example, the power inverter 100 may convert direct-current power (DC) to alternating-current (AC) power. The power inverter 100 may receive power from a DC power source 102. In one example, the DC power source 102 may be photovoltaic-based, such as one or more photovoltaic (PV) modules. In FIG. 1, the power source 102 may be represented by a voltage source 104 coupled in series with a resistive element ($R_s$) 106. The inverter 100 may convert the DC power from the power supply 102 to AC power delivered at an AC output load 108 of the inverter 100. In alternative examples, other DC power sources may be implemented with the inverter 100.

Figure 4:
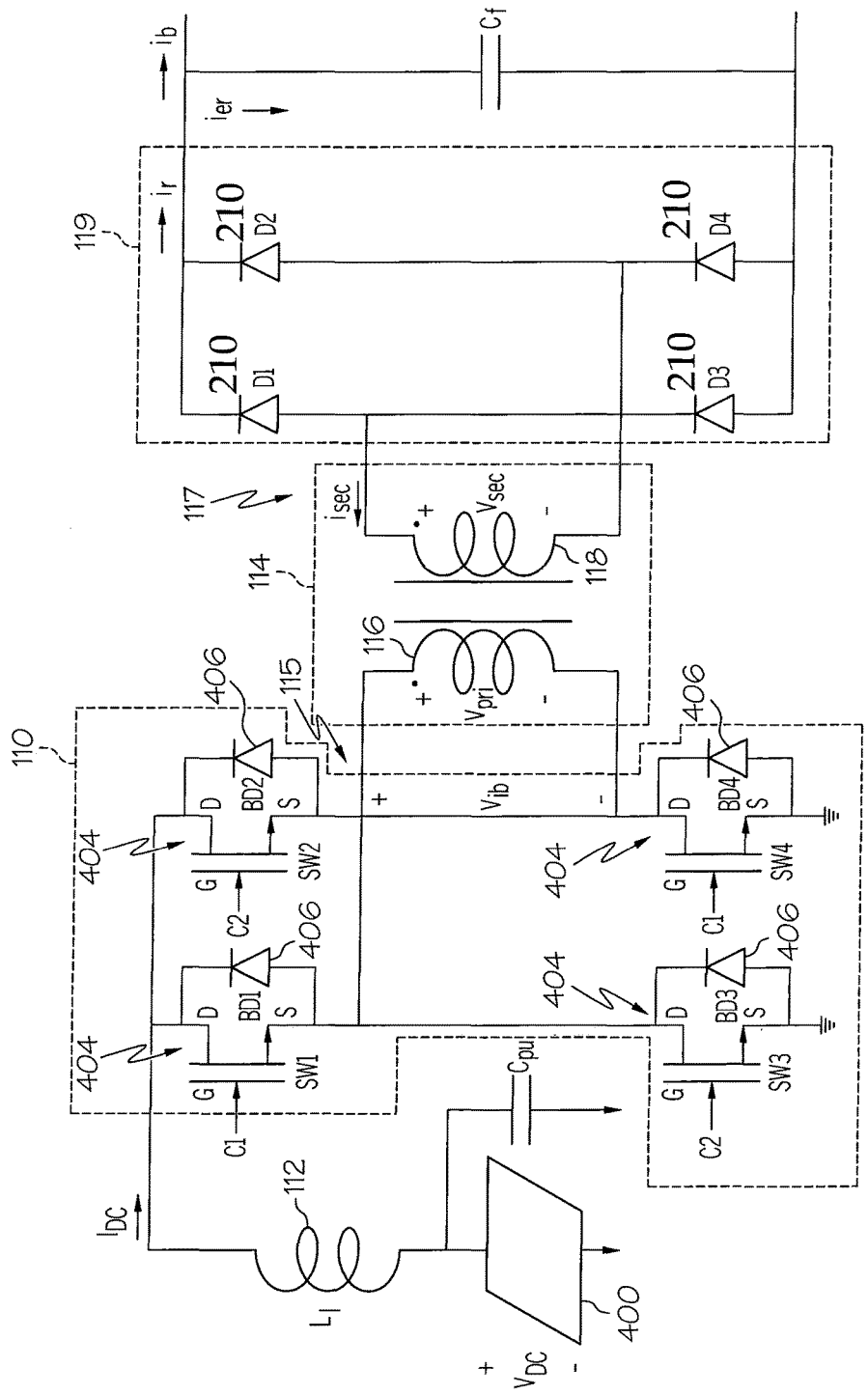
FIG. 4 is a circuit diagram an example portion of the power inverter of FIG. 1.

The inverter 100 may include an input bridge (IB) 110. The input bridge 110 may include one or more circuit elements coupled to one another to convert the DC power from the DC power supply 102 to AC power. One example of the input bridge 110 is shown in FIG. 4. In FIG. 1, a line inductance ($L_l$) 112 coupled between the power supply 102 and the input bridge 110 is represented by an inductive element. The line inductance 112 may be one or more inductors used to reduce the current ripple transmitted to the DC power supply 102. The input bridge 110 may be coupled to a transformer 114 having a primary side 115 and secondary side 117. The primary side 115 of the transformer may include a first winding 116 and the secondary side 117 may include a second winding 118. Each of the first winding 116 and the second winding 118 may include more than one winding coupled in series or other configuration. The transformer 114 may have a winding ratio of 1:N to step up or step down the voltage and current from the output of the input bridge 110. A rectifier (RECT) 119 may be coupled to the second winding 118 of the transformer 114.

Figure 5:
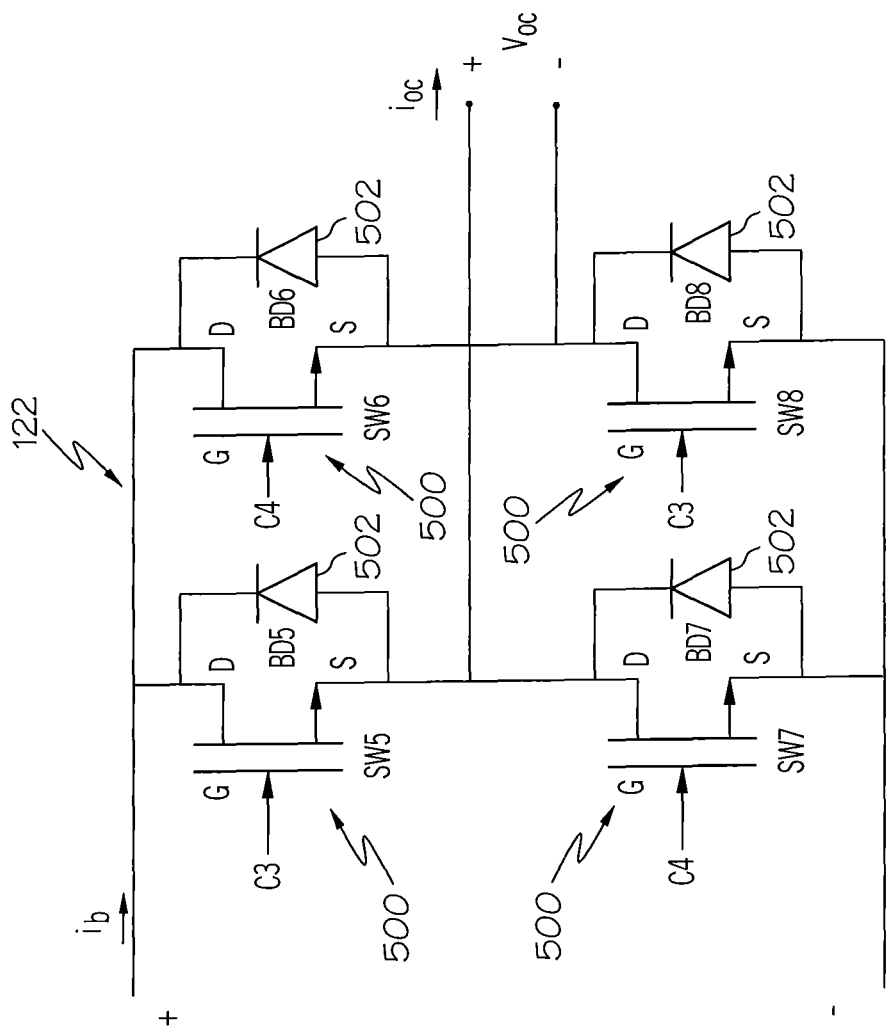
FIG. 5 is a circuit diagram another example portion of the power inverter of FIG. 1.

The AC power from the transformer 114 may be received by the rectifier 119. The rectifier 119 may include one or more circuit elements coupled to one another to convert the AC power from the transformer 114 to DC power. One example of the rectifier 119 is shown in FIG. 5. The rectified power, voltage and current, may be filtered by a filter capacitance ($C_f$) 120 represented in FIG. 1 as a capacitive element that is coupled in parallel to the rectifier 119. The filtered voltage and at least a portion of the current (see FIG. 4) from the rectifier 119 may be received by an output bridge 122. The output bridge 122 may include one or more circuit elements coupled to one another to convert the filtered DC power to AC power that may be delivered to an AC output load 108. One example of the output bridge 122 is shown in FIG. 5.

Figure 6:
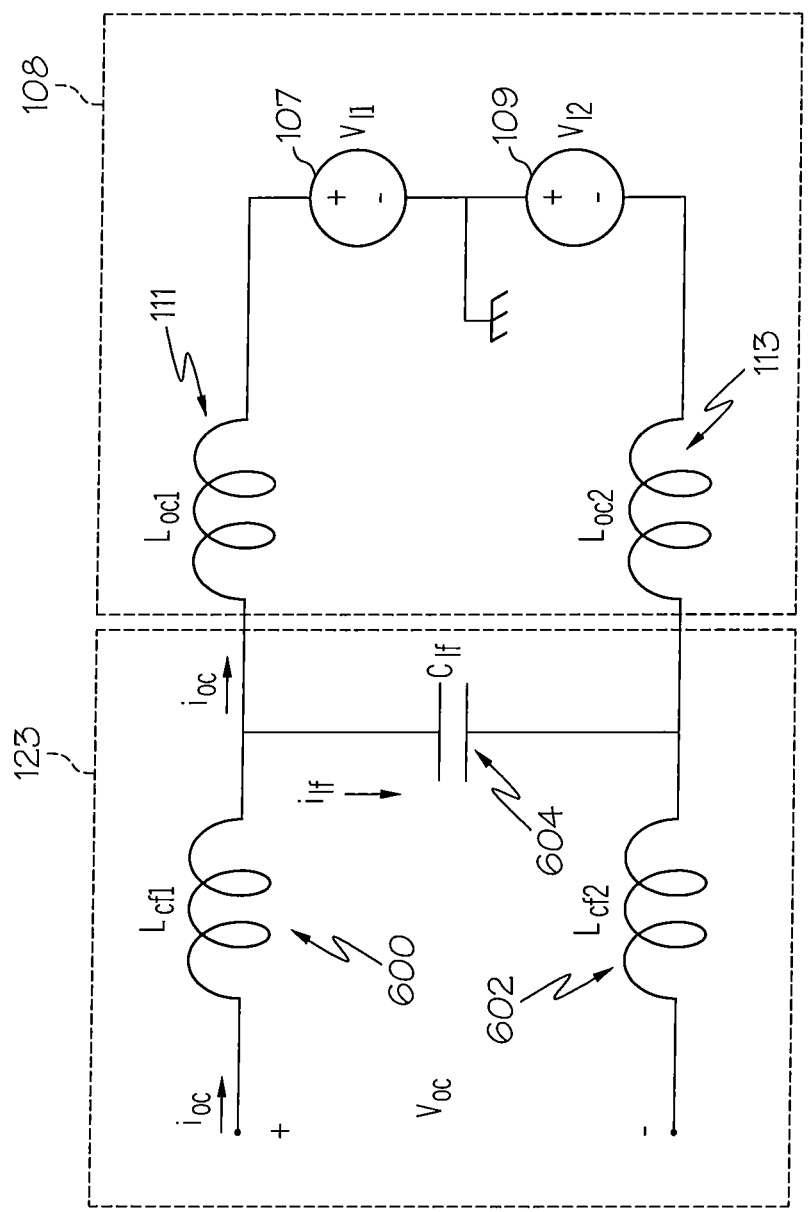
FIG. 6 is a circuit diagram another example portion of the power inverter of FIG. 1.

In FIG. 1, the inverter 100 may include a line filter 123 to filter output voltage of the output bridge 122 prior to the AC power being delivered to the output load 108. One example of the line filter 123 is shown in FIG. 6. In FIG. 1, the output load 108 may be a residential AC load having a split-phase configuration such as that found at residential premises in a United States electrical grid. In other examples, the output load 108 may be an industrial premises or any other load configured to receive AC power.

The output load 108 may be represented as a first voltage source ($v_{l1}$) 107 and a second voltage source ($v_{l2}$) 109 having an earth ground coupled between the two voltage sources 107 and 109. The output load 108 may also be represented as including a first line inductance ($L_{OL1}$) 111 and a second line inductance ($L_{OL2}$) 113 coupled between a respective voltage source 107 and 109 and the output bridge 122. An output sense resistor ($R_{so}$) 125 may be coupled between the output bridge 122 and the line filter 123. Current flowing through the output sense resistor 125 may be used to determine the current being provided to the output load 108.

Inverters such as the inverter 100 may implement an isolation barrier. An isolation barrier may provide at least one point of complete physical disconnection between components of the inverter 100. Use of the transformer 114 allows the inverter 100 to function with the existence of an isolation barrier. A physical gap exists between the first winding 116 and the second winding 118 with power being transferred through varying the mutual magnetic flux shared by the first winding 116 and the second winding 118 in order to induce a voltage across the second winding 118. No physical connection is used in providing electrical energy from the primary side 115 to the secondary side 117, thus, providing an isolation barrier. Use of an isolation barrier may be required in some circumstances due to regulatory requirements or safety concerns.

Use of an isolation barrier prevents the inverter 100 from having a common earth ground shared by all components of the inverter 100. Instead, portions of the inverter 100 may have separate groundings that may or may not be connected to an earth ground. Separate groundings allow a respective portion of the inverter 100 to be locally grounded, but may not be at the same potential as other portions. For example, in FIG. 1, the inverter 100 may be grounded separately on both the primary side 115 and the secondary side 117 of the transformer 114. The inverter 100 may be grounded on the DC side of the input bridge 110, as indicated by ground connection 126 in FIG. 1. The inverter 100 may also be grounded on the secondary side of the transformer 114. In particular, the inverter 100 may also be grounded on the DC side of the output bridge 122, or alternatively on the AC side of the output bridge 122, as shown by ground connections 128 and 130, respectively. In alternative examples, the groundings may be connected to other locations on the inverter 100 on the primary side 115 and/or the secondary side 117 of the inverter 100.

During operation of the inverter 100, knowledge of the operating conditions of the power supply 102 may be desired, such as the instantaneous voltage $V_{DC}$ and current $I_{DC}$. While these conditions may be monitored on the primary side 115 of the transformer 114, due to the isolation barrier in the inverter 100, no common physical connections are present connecting both the primary side 115 and secondary side 117 for monitoring. However, knowledge of the operating conditions on the primary side 115 of the transformer 114 may be desired to be available on the secondary side 117 of the transformer 114 in order to control power being delivered to the output load 108 or for informational purposes.

In FIG. 1, the inverter 100 may include a primary side controller (PSC) 132 and a secondary side controller (SSC) 134. The primary side controller 132 may determine the operating conditions (e.g., current, voltage, impedance, capacitance, other characteristics, or combinations thereof) from the power supply 102, such as the voltage $V_{DC}$, from a sensor 133. The sensor 133 may be a voltage divider circuit or other circuit configured to sense the voltage produced by the power source 102. An input sense resistor ($R_{si}$) 135 may be used to provide the current $I_{DC}$, or a current representative of $I_{DC}$ to the primary side controller 132. Based on the operating conditions, the primary side controller 132 may generate one or more control signals 136 to control the output of the input bridge 114, as explained in further detail in FIG. 2.

During operation, the input bridge 110 may be controlled to generate an output voltage $v_{ib}$ having a series of pulses alternating in polarity supplied to the first winding 116 of the transformer 114. Supplying the output voltage $v_{ib}$ to the first winding 116 may cause a primary voltage $v_{pri}$ to be applied across the first winding 116. Current flowing from the input bridge 110 (see FIG. 4) into the first winding 116 may cause the first winding 116 to experience a change in magnetic flux resulting in a secondary voltage $v_{sec}$ being created in the second winding 118 on the secondary side 117 of the transformer 114.

The control signals 136 generated by the primary side controller 132 may control the duty cycle d (pulse width) and/or the frequency $f_p$ of the pulses of the output voltage $v_{ib}$. During operation, the input bridge 110 may be controlled by the primary side controller 132 to produce a voltage including pulses at a desired frequency $f_p$. Thus, the frequency of the primary side voltage $v_{pri}$ may have a frequency of $f_p$ resulting in the secondary side voltage $v_{sec}$ having a frequency of $f_p$ as well. During operation, the frequency $f_p$ may be varied within a particular range without any significant adverse effects regarding the desired output of the inverter 100. Varying the frequency $f_p$ may allow information regarding the operating conditions of the power supply 102 to be conveyed to the secondary side 117 of the transformer 114 without physical connection to the primary side 115 of the transformer 114 or without the need to implement other manners of communication between the primary side 115 and the secondary side 117, such as wireless communication (e.g., light emitting diodes, radio frequency transmission, capacitive coupling, etc.) between the primary side controller 132 and the secondary side controller 134.

As the input bridge 110 generates pulses applied to the first winding 116 to generate the voltage $v_{ib}$, the secondary side controller 134 may detect the secondary voltage $v_{sec}$ across the second winding 118 through one or more sensors 140, such as voltage divider circuit, for example. The secondary voltage $v_{sec}$ may be received by a rectifier 142. The secondary voltage $v_{sec}$ may be buffered and scaled by a scaling device 143, such as an op amp, comparator, or other suitable device, in order to be compatible with logic-level integrated circuits. The output voltage $v_{ro}$ of the rectifier 142 may be a unipolar pulse train with a frequency double that of the voltage $v_{sec}$–frequency $f_p$. The secondary side controller 134 may determine the operating conditions of the power supply 102 based on the output voltage $v_{ro}$ as further described with regard to FIG. 3. A communication device 146 may be used to transmit the operating conditions wirelessly, such as to a central authority for processing and analysis. In other examples, operating conditions of the DC power supply may be communicated through power lines electrically coupled to the output load 108 as an alternative to the communication device 146 or used in tandem.

Figure 2:
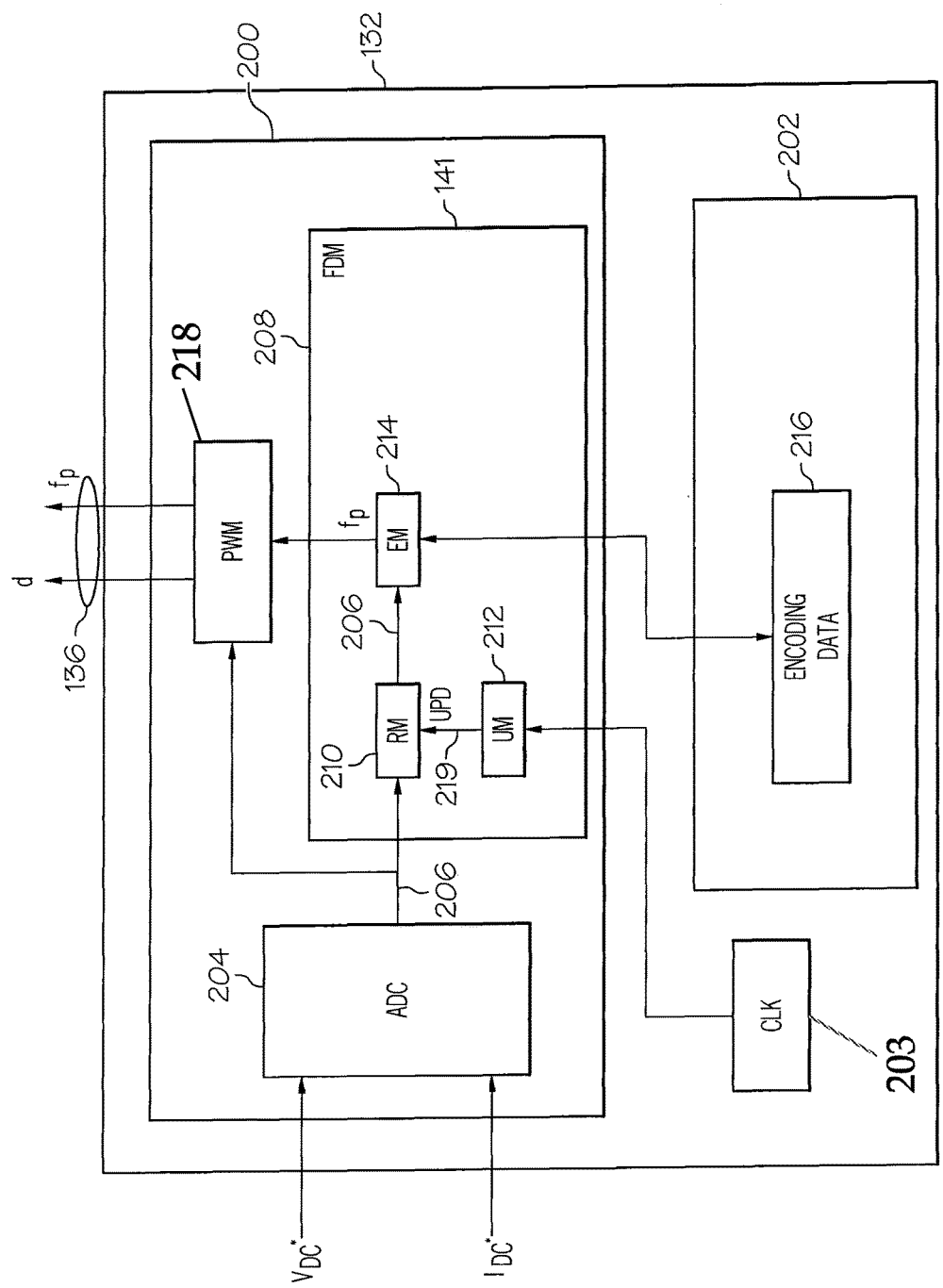
FIG. 2 is a block diagram of an example controller of the power inverter of FIG. 1.

FIG. 2 is a block diagram of an example of the primary side controller 132. In one example, the primary side controller 132 may be a microcontroller including a processor 200, a memory 202, clock 203, and I/O ports. The memory 202 may include one or more memories and may be non-transitory computer-readable storage media or memories, such as a cache, buffer, RAM, removable media, hard drive or other computer readable storage media. Computer readable storage media may include various types of volatile and nonvolatile storage media. Various processing techniques may be implemented by the processor 200 such as multi-processing, multitasking, parallel processing and the like, for example. The processor 200 may include one or more processors.

The processor 200 may include an analog-to-digital converter (ADC) 204. Alternatively, the ADC 204 may be separate from the processor 200. The ADC 204 may receive the voltage $V^*_{DC}$ and current $I^*_{DC}$ of the power supply 102, which may be a voltage and current representative of the voltage $V_{DC}$ and the current $I_{DC}$, respectively, or the actual voltage $V_{DC}$ and the current $I_{DC}$. The ADC 204 may digitize these signals into one or more data signals 206 and provide the data signals 206 to a frequency determination module (FDM) 208. The modules are software, hardware or some combination thereof executable by a processor, such as the processor 200. Software modules may include instructions stored in the memory 202, or other memory device, that are executable by a processor or processors. Hardware modules may include various devices, components, circuits, gates, circuit boards, and the like that are executable, directed, and/or controlled for performance by a processor. The FDM 208 may determine the frequency $f_p$ of the input bridge 110 output based on the current operating conditions of the power supply 102.

During operation, the FDM 208 may receive the data signals 206 from the ADC 204 indicative of the power supply voltage $V_{DC}$ and current $I_{DC}$. The FDM 208 may include a read module (RM) 210. The read module 210 may receive the data signals 206 from the ADC 204 to determine the voltage $V_{DC}$ and current $I_{DC}$ based on the data signals 206 and, in one example, the read module 210 may determine if the data signals 206 are valid. The FDM 208 may also include an update module (UM) 212. The update module 212 may receive a clock signal from the clock 203 used to generate a periodic update signal (UPD) 219. The periodic update signal 219 may indicate to the read module 210 the time at which the read module 210 may sample the data signals 206. The periodic update signal 219 may be generated at a predetermined update period of $T_{update}$. In other examples, the update period $T_{update}$ may be dynamically adjusted during operation of the inverter 100.

Upon receipt and completion of any validation techniques, the read module 210 may provide the data 206 to an encoding module (EM) 214. In the example of FIG. 2, the encoding module 214 may retrieve encoding data 216 from the memory 202. The encoding data 216 may indicate a particular frequency at which to control the frequency $f_p$ of output voltage $V_{ib}$ in order to convey the operating conditions of the power supply 102 to the secondary side 117 of the transformer 114. In one example, the encoding data 216 may include one or more tables mapping particular frequency values to particular operating condition points of the power supply 15 102. Table 1 below is one example of the encoding data 216 in which the desired operating frequency range of the input bridge 110 has a midpoint of approximately 50 kHz.

TABLE 1

| Current/Voltage | 0 A | 0.5 A | 1.0 A | 1.5 A | ... | 10 A |
|---|---|---|---|---|---|---|
| 0 V | 49,500 Hz | 49,550.5 Hz | 49,551 Hz | 49,551.5 Hz | ... | 49,509.5 Hz |
| 0.5 V | 49,510 Hz | 49,510.5 Hz | 49,511 Hz | 49,511.5 Hz | ... | 49,519.5 Hz |
| 1.0 V | 49,520 Hz | 49,520.5 Hz | 49,521 Hz | 49,521.5 Hz | ... | 49,529.5 Hz |
| ... | ... | ... | ... | ... | ... | ... |
| 50.0 V | 50,490 Hz | 50,490.5 Hz | 50,491 Hz | 50,491.5 Hz | ... | 50,499.5 Hz |

In one example, the desired operating condition to convey to the secondary side 117 may be the voltage $V_{DC}$ and current $I_{DC}$ provided by the power supply 102. Table 1 includes a frequency corresponding to a voltage and current for the voltage $V_{DC}$ and the current $I_{DC}$, in increments of 0.5 V and 0.5 A, from a range of 0V to 50V and 0 A to 10 A. The output voltage $v_{ib}$ of the input bridge 110 may be controlled at one of the particular frequencies listed in Table 1 to convey a corresponding operating condition point. In alternative examples, the encoding data 216 may include other data allowing selection of the frequency $f_p$, such as equation-based data, frequency shift keying, or orthogonal frequency division multiplexing.

In using tables, such as Table 1, the encoding module 214 may round the instantaneous values of the current $I_{DC}$ and voltage $V_{DC}$ in order to select the corresponding frequency. Upon selection of the frequency by the FDM 208, the frequency $f_p$ may be provided to a pulse width modulator (PWM) 218. The PWM 218 may also receive the data 206 to determine the duty cycle d independently from the FDM 208. The PWM 218 may generate the control signals 136 based on the data 206 and frequency $f_p$ provided by the FDM 208.

Figure 3:
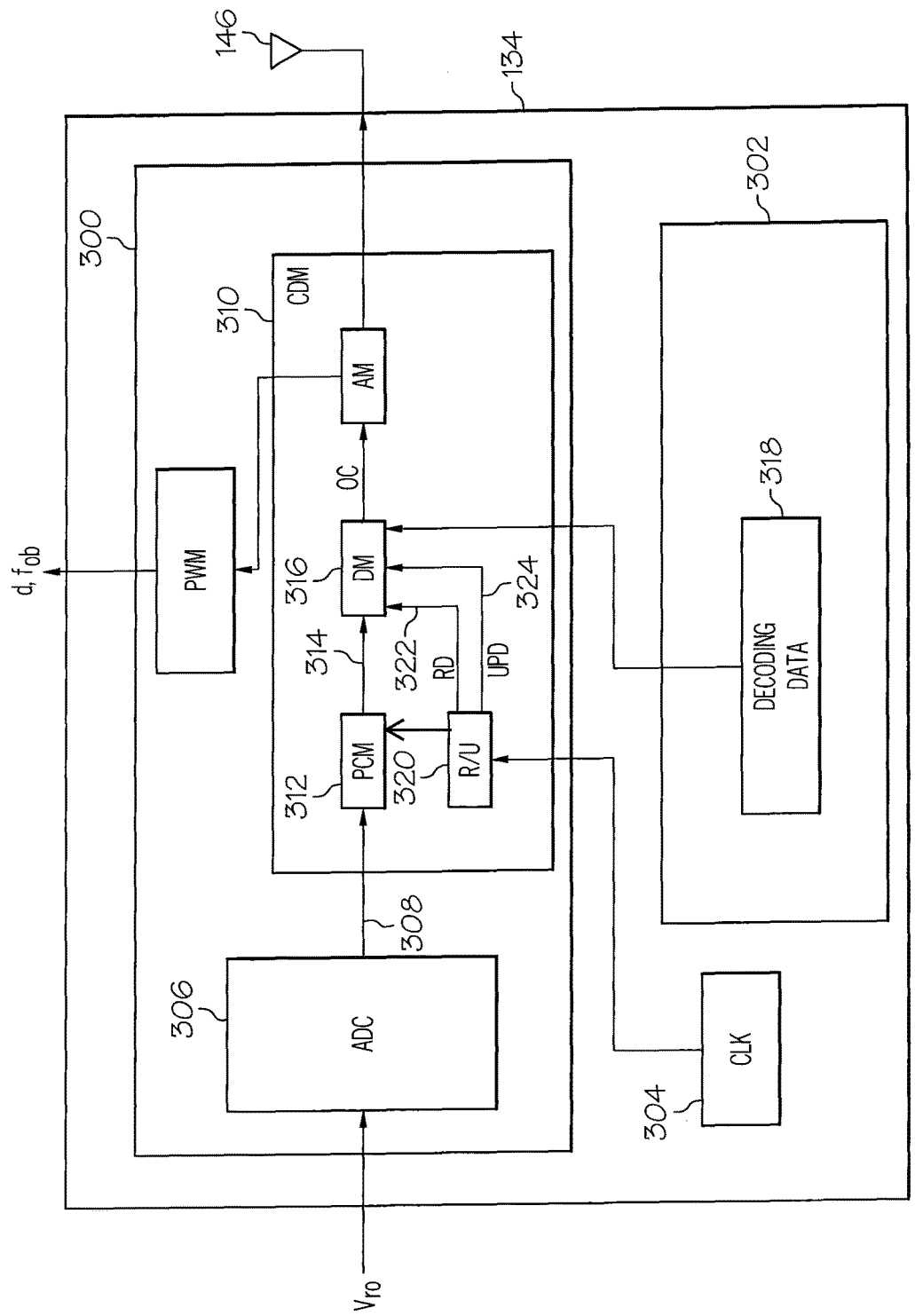
FIG. 3 is a block diagram of another example controller of the power inverter of FIG. 1.

FIG. 3 is a block diagram of an example of the secondary side controller 134. The secondary side controller 134 may be a microcontroller that includes a processor 300, memory 302, as well as I/O ports, and clock (CLK) 304. The processor 300 may include an ADC 306. Alternatively, the ADC 306 may be separate from the processor 300. The ADC 306 may receive and digitize the voltage Vro and provide a data signal 308 indicative of the voltage Vro to a condition determination module (CDM) 310 executed by the processor 300 or other hardware. The CDM 310 may determine the operating conditions conveyed through the frequency fp based on the data signal 308. The CDM 310 may include a pulse counter module (PCM) 312. The PCM 312 may determine the number of pulses included in the voltage Vro signal over a predetermined read period $T_{read}$.

The number of pulses 314 may be relayed from the PCM 312 to a decoding module (DM) 316. The decoding module 316 may determine the operating conditions corresponding to the number of pulses counted over by the PCM 312 over the period $T_{read}$. In one example, the decoding module 316 may implement decoding data 318 stored on the memory 302. The decoding data 318 may include various operating points of the operating conditions of the power supply 102 that correspond to the number of pulses read over the period $T_{read}$. In one example, the decoding data 318 may include one or more tables having operating conditions of the power supply 102. In one example, a desired output frequency range of the input bridge 110 may have a midpoint of approximately 50 kHz. The frequency $f_p$ may be modulated within a range of about +/−5% of a particular switching frequency, however, in order to convey operating condition information regarding the power supply 102 to the secondary side 117 of the transformer 114. Other tolerances are possible. The decoding data 318 may include tables having a number of possible operating conditions points of the power supply 102. Each possible operating condition points in the table may correspond to a particular number of pulses counted by the pulse counter over the period of $T_{read}$.

Table 2 includes an example of a table that may be included in the decoding data 318.

TABLE 2

| Voltage/Current | 0 A | 0.5 A | 1.0 A | 1.5 A | ... | 10 A |
|---|---|---|---|---|---|---|
| 0 V | 99000 | 99001 | 99002 | 99003 | ... | 99019 |
| 0.5 V | 99020 | 99021 | 99022 | 99023 | ... | 99039 |
| 1.0 V | 99040 | 99041 | 99042 | 99043 | ... | 99059 |
| ... | ... | ... | ... | ... | ... | ... |
| 50.0 V | 100980 | 100981 | 100982 | 100983 | ... | 100999 |

Table 2 may be applied to the situation in which the voltage produced of the power supply 102 is to be conveyed to the nearest 0.5 V and the current produced by the power supply 102 is to be conveyed to the nearest 0.5 A. In Table 2, approximately 50 kHz may be the midpoint of the frequency range in which the output of the input bridge 114 is desired to operate resulting in 100 discrete voltage values and 20 discrete current values that may occur according to Table 2. Thus, there are a total of 2,000 possible combinations of voltage and current. As such, 2,000 possible pulse counts are used within the given time frame. When the frequency $f_p$ is at 50 kHz, the pulse counter module 148 may count 100,000 pulses. There would be a 2001 pulse difference between 99 kHz, (99,000 pulses per second) and 101 kHz (101,000 pulses per second). Based upon Table 2, the secondary side controller 134 determines the voltage and current of the power supply 102 based on the counted number of pulses over the read period $T_{read}$. In Table 2, the read period $T_{read}$ is one second.

A read/update module (R/U) 320 may provide a read signal (RD) 322 and an update signal (UD) 324 to both the pulse count module 312 and the decoding module 316. The read/update module 320 may receive a clock signal from the clock 304 used to generate the read signal 322 and update signal 324. The read signal 322 may indicate to the PCM 312 the time at which to start counting the pulses in the data signal 308. Upon receiving the update signal 324, the PCM 312 may restart the counting. The read signal 322 and the update signal 324 may be coordinated such that read signal 322 is sent after the update signal 324. The read signal 322 may also indicate a duration of time over which to count the pulses or an end time. In one example, $T_{update}$ may be much greater than $T_{read}$. For example, $T_{read}$ may be one second in duration, while $T_{update}$ may be several minutes. In such an example, the pulse counter module 312 may count the number of pulses over several periods of $T_{read}$ and take the average number of pulses per read period $T_{read}$. This average value may be used to by the encoding module 316 to identify the operating condition of the power supply.

The secondary side controller 134 may also detect the frequency of the secondary voltage $v_{sec}$ without use of the rectifier 142. In one example, the scaling device 143 may be an available device within the secondary side controller 134. The scaling device 143 may scale the secondary voltage $v_{sec}$ and the secondary side controller 134 may detect the frequency directly from the scaled version of the secondary voltage $v_{sec}$. The encoding data 318 may include data representative of that shown in Table 1.

FIG. 4 is a circuit diagram of an example of the power supply 102, and input bridge 110, transformer 114, and rectifier 119 of the inverter 100. In FIG. 4, the power supply 102 of FIG. 2 may be a photovoltaic module 400 including one or more photovoltaic cells. In FIG. 4, the PV module 400 is grounded and may generate a voltage Voc based on the received solar energy. A filter capacitor $C_{pu}$ is coupled in parallel to the PV module 400. The current $I_{DC}$ may be supplied from the PV module 400.

The input bridge 110 may include a plurality of switches 404. Each switch 404 in FIG. 4 is individually designated as SW1-4. In the example of FIG. 4, each switch 404 is embodied as a metal oxide semiconductor field-effect transistor (MOSFET). The term MOSFET may refer to other field effect transistors, such as those having a gate material other than metal, such as polysilicon (polycrystalline silicon) or other suitable gate material. The term MOSFET may also include insulated gate bipolar transistors (IGBTs) and insulated-gate field-effect transistors (IGFETs) as well. Other suitable switch types may be used for SW1 through SW4. In FIG. 4, each switch 404 may include an intrinsic body diode 406, individually designated as BD 1-4. Each switch 404 may include a gate (G), drain (D), and source (S). The switches 404 may be coupled to one another in order to convert the DC power generated by the power supply 102 to AC power. The input bridge 110 may supply the AC power to the first winding 116 of the transformer 114. The input bridge 110 may be controlled by the primary side controller 132 (not shown) through the control signals in order to provide the current to the first winding 116 alternating the polarity of the supplied current in order to generate a voltage across the second winding 118.

The primary side controller 132 may generate the controls signals 136 to operate the switches 404 in such a manner. The control signals 136 generated by the primary side controller 132 may include a pair of control signals C1 and C2. The first winding 116 may be coupled to the input bridge 114 such that when control signal C1 is applied to the gates of switches SW1 and SW4 and the control signal C2 is not applied to the switches SW2 and SW3, the current IDe may flow through the switches SW1 and SW4. Current flowing through the switches SW1 and SW 4 may be considered positive in polarity with respect to the first winding 116. When negative current with respect to the first winding 116 is desired, the control signal C2 may be applied to the switches SW2 and SW3 and the control signal C1 is not applied to the switches SW1 and SW2, the current may flow through the switch SW2, through the first winding 116, and through the switch SW3. The frequency with which the switching signals C1 and C2 are alternately applied to the switches 204 represents the frequency with which the output pulses of the input bridge 114 are applied to the first winding 116—frequency fp. The length of time the switch pairs SW1-4 and SW2-3 remain on determines the width (duty cycle d) of a particular pulse.

Upon generation of the pulses of the input bridge 114 to the first winding, the secondary voltage Vsec may be generated across the second winding 118. The rectifier 119 may include a plurality of diodes 210, individually designated as D1-D4 in FIG. 4, coupled to one another to convert the AC power received from the secondary side 117 of the transformer 114 to DC power. In FIG. 4, the second winding current $i_{sec}$ may be considered positive with respect to the second winding 118 in the direction indicated in FIG. 4. Positive current $i_{sec}$ flowing through the second winding 118 will also flow through diodes D2 and D3, causing the rectifier output current $i_r$ to be positive with respect to the output load 108 (not shown). When the current $i_{sec}$ induced in the second winding 118 is negative, the current $i_{sec}$ will flow through the diodes D1 and D4, causing the current if to be positive with respect to the output load. Thus, the current flowing out of the rectifier 119, current $i_{sec}$ will be DC current. A portion of the current $i_r$, designated as $i_{cf}$ will flow the filter capacitor $C_f$, the difference of current $i_b$ will flow towards the output bridge 108.

FIG. 5 is circuit diagram of an example of the output bridge 122. The output bridge 122 may include a plurality of switches 500, individually designated as SW5-S, coupled to one another to convert the DC power received from the rectifier 119 to AC power. The switches 500 may be similar to the switches 404 in FIG. 4. For example, the switches 500 may be MOSFET switches each having an intrinsic body diode 502, individually designated as BD5-8. The switches 500 may receive control signals CS3 and CS4 from the secondary side controller 134 (not shown) or other suitable controller. Operating in manner similar to the input bridges 114, when switches SW5 and SWS receive control signals CS3 and switches SW6 and SW7 do not receive control signal CS4, the current $i_b$ will flow through switches SW5 and SWS causing the output current $i_{oc}$ of the output bridge 122 to be positive with respect to the output load 108. When the control signals C3 and C4 are alternated, e.g., switches SW2 and SW3 turned on and SW1 and SW4 turned off, the current $i_{oc}$ and voltage $v_{oc}$ may be negative in polarity with respect to the output load 108.

FIG. 6 is a circuit schematic of an example of the line filter 123 connected to the output load 108. The line filter 123 may include filter inductances $(L_{f1})$ 600 and $(L_{f2})$ 602 each individually represented as a single inductor. However, the filter inductances 600 and 602 may each include single or multiple inductors. A filter capacitance $(C_{lf})$ 604 may be electrically coupled between the filter inductances 600 and 602 and connected in parallel with the output load 108.

During operation, the current $i_{oc}$, when positive with respect to the output load, may flow through the filter inductance $L_{f1}$ in the direction indicated in FIG. 6. A portion of the current $i_{oc}$ may flow through the filter capacitor 604, represented as current $I_{lf}$. The difference in current, current $i_{load}$, may flow through the output load 108. The line filter 123 acts to smooth the output current $i_{oc}$ flowing from the output bridge 122. As the inverter 100 continues to operate, the polarity of the current $i_{oc}$ alternates flowing through the output load 108 in an opposite direction as that described.

Figure 7:
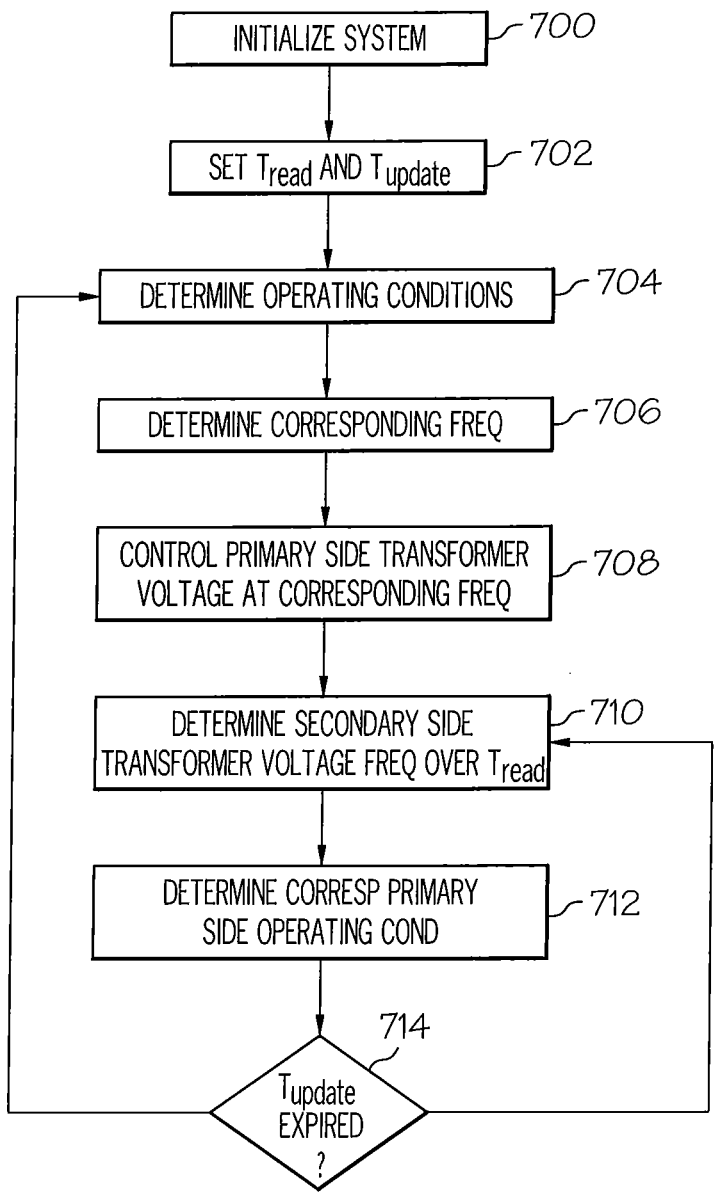
FIG. 7 is one example of an operational flow diagram of the power inverter of FIG. 1.

FIG. 7 is an operational flow diagram of example communication of information associated with the power supply 102 by the inverter 100. In one example, the primary side controller 132 and the second side controller 134 may be initialized (block 700) such as an initial start-up or system reboot scenario. Upon initialization, the read period $T_{read}$ and the update period $T_{update}$ may be set (block 702). The primary side controller 132 may determine the operating conditions of the power supply 102 (block 704), such as the voltage and/or current, for example. The primary side controller 132 may determine a corresponding frequency and/or PWM of the operating conditions (block 706), such as through look-up tables, predetermined equations, or other manner.

The primary side controller 132 may control the input bridge 110 to output a voltage having the determined frequency and/or PWM (block 708). The voltage of the input bridge 110 may be applied to the primary winding 116 of the transformer 114 generating the secondary voltage $v_{sec}$ across the secondary winding 118. The secondary side controller 134 may determine the frequency and/or PWM of the secondary voltage $v_{sec}$ over the read period $T_{read}$ (block 710). The secondary side controller 134 may determine the operating conditions of the DC power source 102 based on the frequency and/or PWM of the secondary voltage $v_{sec}$ (block 712). The primary side controller 132 may determine if the update period $T_{update}$ (block 714) has expired. Upon expiration of the update period $T_{update}$, the primary side controller 132 may determine the current operating conditions of the DC power supply. If the update period $T_{update}$ has not expired, the primary side controller 134 may continue to determine the frequency and/or PWM of the secondary voltage $v_{sec}$ during the read period $T_{read}$.

While FIGS. 1-7 illustrate and describe communication using the transformer 114 through the inverter 100, such communication may be extended to various power converter and inverter topologies. For example, communication via the transformer 114 may be applied to various power converters used to convert AC power to DC power, such as buck, boost, and flyback converters, for example. While various embodiments of the invention have been described, it will be apparent to those of ordinary skill in the art that many more embodiments and implementations are possible within the scope of the invention. The various embodiments described herein include a variety of electrical elements and combinations of electrical elements, such as inductors, capacitors, voltage sources, switches, resistors, diodes, and power converters electrically coupled in various manners. The described example configurations of electrical elements and devices are examples that may be embodied through equivalent configurations having additional or fewer of the described elements, circuits, and devices, and alternative elements, alternative circuits, and/or alternative devices while remaining within the scope of invention. Accordingly, the invention is not to be restricted except in light of the attached claims and their equivalents.

I claim:

1. A controller comprising:
a first processor configured to receive a plurality of circuit operational status inputs; and
a memory in communication with the first processor,
wherein the first processor is further configured to generate command signals to convert a direct voltage to an alternating voltage, the alternating voltage sent to a first winding of a transformer,
wherein the command signals have a cyclical frequency, and
wherein the first processor is further configured to modify the cyclical frequency of the command signals within a range to encode data for communication of that encoded data across the first winding and a second winding of the transformer.

2. The controller of claim 1 wherein the command signals are gate signals for opening and closing at least one pair of switches positioned in a power circuit.

3. The controller of claim 1 wherein the operational status inputs include data signals from an analog to digital converter, the analog to digital converter
receiving a dc voltage analog input and converting the voltage input to a dc voltage digital output and
receiving a dc current input and converting the current input and dc current digital output.

4. The controller of claim 1 wherein frequency modulation of the command signals is used by the first processor to encode the data and wherein the encoded data is configured by the first processor for receipt by a second processor monitoring power operations on a secondary side of the transformer.

5. The controller of claim 4 wherein the first processor is further configured to receive frequency modulation communications from the second processor via the transformer.

6. The controller of claim 5
wherein the frequency modulation sent by the first processor includes operating conditions of a dc voltage conversion circuit, and
wherein the first processor is further configured to scale received frequency modulation communications from the second processor according to a winding ratio of the transformer.

7. The controller of claim 1 wherein the memory stores instructions for data to be encoded by the first processor, the instructions comprising operating frequency ranges for the command signals to indicate different dc voltages.

8. A controller system comprising:
a first controller configured to generate gate signals for a plurality of switches, the gate signals controlled by the first controller creating an alternating voltage at a variable frequency,
wherein the first controller is further configured to modulate the variable frequency of the alternating voltage,
wherein the modulation of the variable frequency serves to encode operational data of a power circuit to communicate the encoded data across windings of a transformer.

9. The controller system of claim 8
wherein the first controller is further configured to receive frequency modulation communications from a second controller,
wherein the frequency modulation communications are made across the transformer and,
wherein the transformer is a power conversion transformer.

10. The controller system of claim 8 wherein the first controller is further configured such that the gate signals are operated at a switching frequency and this switching frequency is varied by the first controller in a range of ±5% of the switching frequency.

11. The controller system of claim 10 wherein the switching frequency is 50 kHz.

12. The controller system of claim 8 wherein the first controller is further configured to send encoded operational data indicative of operating points of the power circuit.

13. The controller system of claim 12 wherein the data indicative of operating points of the power circuit is encoded as pulse counts over a given time frame.

14. The controller system of claim 13 wherein the pulse counts are used to indicate operating voltage or operating current or both of the power circuit.

15. A system for power conversion comprising:
a secondary side controller, the secondary side controller configured to receive encoded data via frequency modulation of an ac voltage sent across a multiple winding transformer,
the secondary side controller configured to be on the secondary side of the multiple-winding transformer of a power conversion circuit, and
the secondary side controller configured to monitor operating conditions of the power conversion circuit.

16. The system of claim 15 wherein the encoded data is indicative of operating conditions of a power circuit.

17. The system of claim 15 further comprising:
a primary side controller, the primary side controller configured to send encoded data via frequency modulation of an ac voltage across the multiple winding transformer, the encoded data indicative of the operating conditions of the power conversion; and
memory, the memory storing decoding data for use by one or both of the controllers, the decoding data providing a correlation between received encoded data and at least an operational voltage or operational current of the power circuit.

18. The system of claim 15 wherein the secondary side controller is further configured to count pulses from the received encoded data and assign at least an operating voltage or an operating current to a power circuit.

19. The system of claim 15 wherein the secondary side controller is further configured to communicate across a multiple winding transformer by sending encoded data via frequency modulation of operating conditions of a power conversion circuit across the multiple winding transformer.

20. The system of claim 19 wherein the multiple winding transformer is a power conversion transformer.

* * * * *